United States Patent [19]

Isaac

[11] 4,397,207

[45] Aug. 9, 1983

[54] SHEET METAL CUTTING DEVICE FOR ARCS AND CIRCLES

[76] Inventor: Dalton Isaac, Box 38, Rosenort, Manitoba, Canada

[21] Appl. No.: 211,700

[22] Filed: Dec. 1, 1980

[30] Foreign Application Priority Data

Feb. 25, 1980 [CA] Canada .................................. 346325

[51] Int. Cl.³ ........................ B23D 19/08; B23D 33/04
[52] U.S. Cl. .......................................... 83/490; 83/192; 83/411 R; 30/165; 144/24
[58] Field of Search .............. 83/491, 492, 490, 411 R, 83/500, 503; 144/24; 30/165

[56] References Cited

U.S. PATENT DOCUMENTS

| | | | |
|---|---|---|---|
| 761,225 | 5/1904 | Ham | 83/503 |
| 902,656 | 11/1908 | Heno et al. | 144/24 |
| 1,105,668 | 8/1914 | Lange et al. | 83/492 |
| 1,311,306 | 7/1919 | Anderson | 83/490 X |
| 1,793,208 | 2/1931 | Biggert | 83/490 |
| 2,042,097 | 5/1936 | Havanas | 30/265 |
| 2,276,365 | 3/1942 | Angel | 30/265 |
| 3,124,182 | 3/1964 | Silken | 144/24 |
| 3,146,675 | 9/1964 | Anderson | 144/24 |
| 3,398,620 | 8/1968 | Gautron | 83/490 |
| 3,791,246 | 2/1974 | Lazickas | 83/491 |

*Primary Examiner*—Donald R. Schran
*Attorney, Agent, or Firm*—Stanley G. Ade

[57] ABSTRACT

A self-contained sheet metal cutter is mounted on a wheeled dolly and includes upper and lower power driven shear cutting wheels between which is engaged the plate or sheet to be cut. An adjustable trammel assembly extends from the dolly and includes a center point member engageable with an aperture in the plate to be cut and which corresponds to the center of the arc or circle. The trammel is adjustable to the radius of the arc or circle and the center point is engaged with the aperture in the sheet whereupon the wheeled dolly is pushed manually around the arc or circle as the shear wheels cut the sheet to the preset radius arc or circle. The rear wheel of the dolly is castor so that it follows the track readily and easily.

11 Claims, 15 Drawing Figures

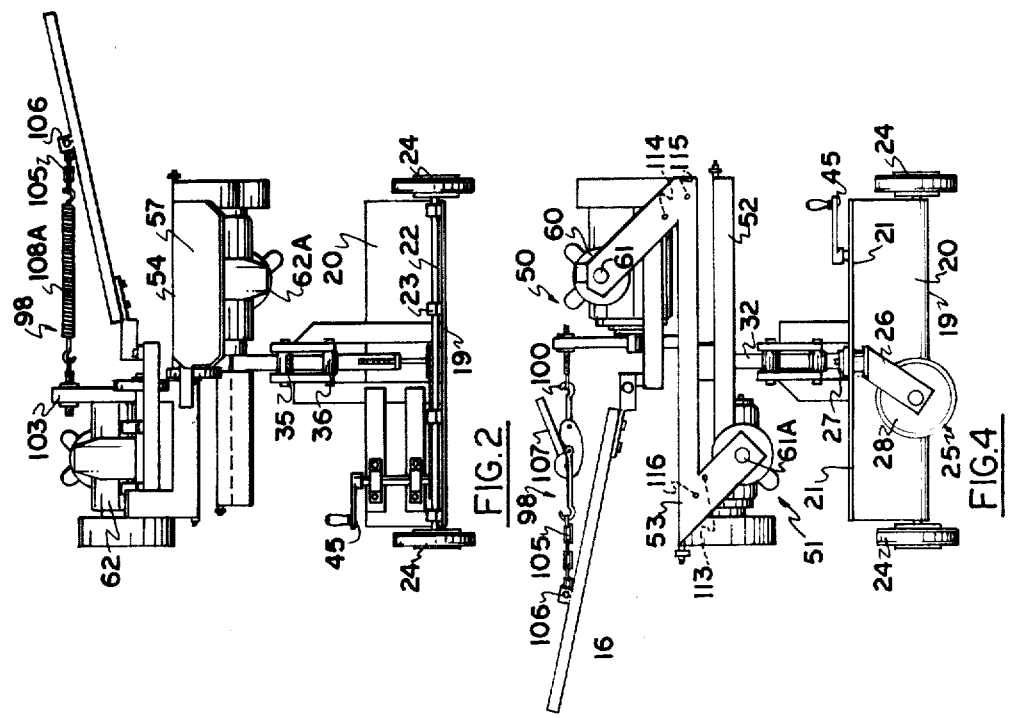
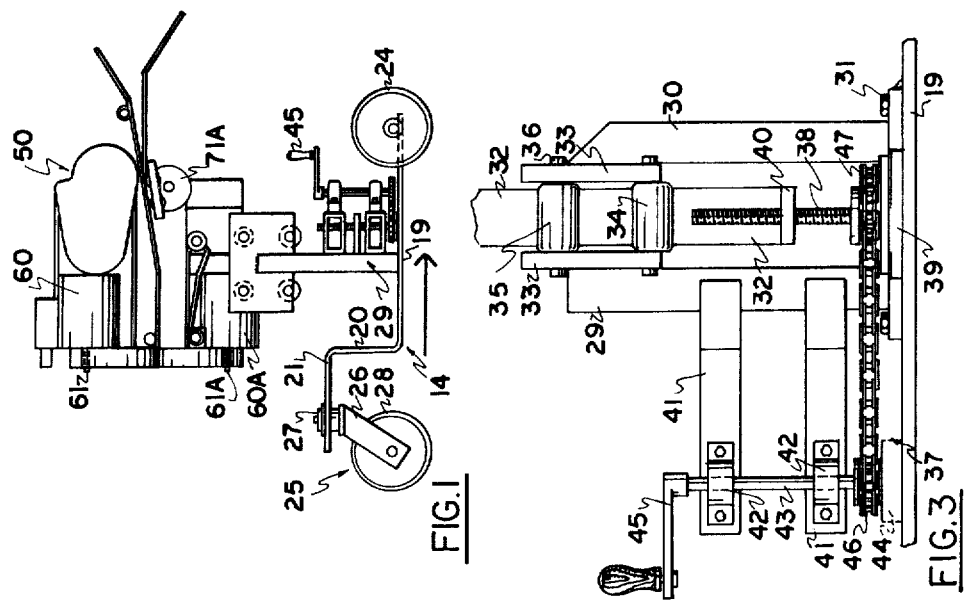

4,397,207

SHEET METAL CUTTING DEVICE FOR ARCS AND CIRCLES

BACKGROUND OF THE INVENTION

This invention relates to new and useful improvements in devices designed specifically to cut arcs or circles in sheet metal although it can be used to cut such arcs in plastic sheet, laminated board or the like.

It is designed specifically for cutting arcs or circles in sheet metal of relatively large radius such as may be used to form conical upper portions for grain bins and the like, arcuate portions for a similar purpose, circular floors and the like.

Heretofore, such arcs or circles have been cut by a power shear which has to be guided manually around the arc or circle which is first marked on the sheet metal being cut and this is awkward, time consuming, and requires considerable skill for accurate cutting.

SUMMARY OF THE INVENTION

The present device overcomes these disadvantages by providing a self-contained wheel mounted cutting assembly which includes an adjustable trammel which may be temporarily anchored to the centre of the arc or circle to be cut whereupon power driven shear wheels engage the sheet metal and cut along the arc or circle preset by the trammel assembly.

In accordance with the invention there is provided an arc or circle cutter for sheet metal comprising in combination a wheeled dolly, supporting structure supported on said dolly and a table upon which is supported part of the sheet being cut, an adjustable trammel assembly extending from said supporting structure and engageable with the sheet at the centre of the arc or radius being cut, upper and lower shear cutter assemblies mounted upon said supporting structure for cutting action upon said sheet being cut and means to drive said cutter assemblies.

Another advantage of the invention is that the cutting of arcs or circles upon sheet metal or the like is simple and accurate.

A still further advantage of the invention is to provide a device of the character herewithin described, which is completely self-contained and which includes shear wheels both of which are power driven.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

FIG. 1 is a side elevation of the device.

FIG. 2 is a front elevation thereof.

FIG. 3 is an enlarged fragmentary front view showing the vertical adjustment portion thereof.

FIG. 4 is a rear view of FIG. 1.

In the drawings like characters of reference indicate the corresponding parts in the different figures.

DETAILED DESCRIPTION

Figure 5:
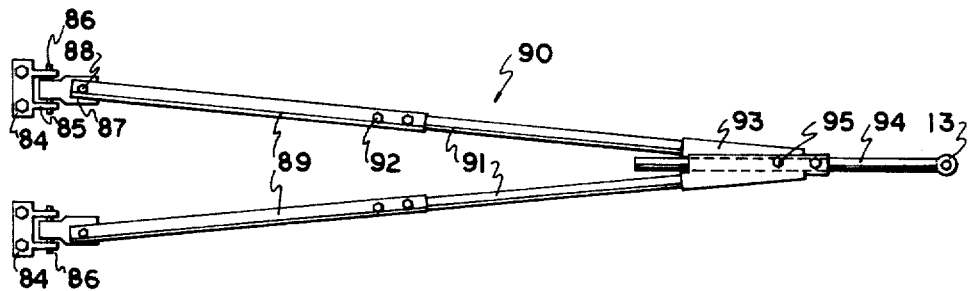
FIG. 5 is a plan view of the trammel assembly per se.
Figure 6:
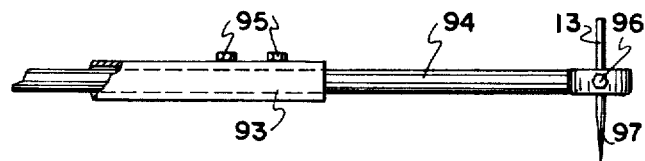
FIG. 6 is a side elevation of the distal end of the trammel assembly per se.

Proceeding therefore to describe the invention in detail, reference should first be made to FIG. 12 in which reference character 10 shows a supporting surface for a sheet metal panel 11 from which an arced portion is to be cut along the curved line indicated by the dotted line 12 with a centre or radius of the arc being illustrated by reference character 13.

The device collectively designated 14, is shown partially through the cutting action, moving in the direction of arrow 15 and includes an adjustable trammel assembly collectively designated 16 having a pointer or centre point member 17 secured to the distal end 18 thereof. This pointer engages through an aperture formed through the sheet metal panel 11 at the centre of radius 13 thus controlling the arcuate movement of the cutter assembly 14 as will hereinafter be described.

In detail, the device collectively designated 14 comprises a dolly having a base plate 19 angulated upwardly at the rear as indicated by 20 and then extending rearwardly with a portion 21 substantially parallel but spaced above the base 19.

A front wheel axle 22 is mounted to the front of the base 19 by means of clamp blocks 23 and a pair of ground engaging wheels 24 are journalled for rotation one upon each end of the transverse axle 22.

A castor wheel assembly collectively designated 25 includes a castoring fork 26 journalled within a bearing block 27 upon the rear horizontal portion 21. A castor wheel 28 is journalled for rotation within the lower end of the castoring fork 26 in the usual way and this castoring wheel 28 is situated upon the longitudinal axis of the base 19 and between the two front wheels 24 and reference to FIG. 12 will show the relative location thereof.

Supporting structure collectively designated 29 extends upwardly from the base 19 of the dolly and includes a pair of square cross sectioned pillars 30 situated in spaced and parallel relationship and secured by the lower ends thereof to the base 19. One method of securement is shown in which square plates 31 are welded to the lower ends of the pillars 30 and these are bolted or otherwise secured to the base plate.

A central pillar 32 is situated between the support pillars 29 and 30 and a pair of plates 33 are secured to the inner faces of the pillars and extend fore and aft and mount a front pair of rollers 34 and a rear pair of rollers 35, upon spindles 36 which extend through the plates and through the rollers. Each front and rear pair of rollers are vertically situated and bear against the front and rear faces of the central pillar 32 and guide same as it moves upwardly and downwardly relative to the support pillars 30.

Means are provided to move the central pillar upwardly and downwardly, said means taking the form of a jack assembly collectively designated 37 and mounted upon the base 19 of the dolly.

In this embodiment, it consists of a vertically situated jack screw 38 bearably supported at the lower end thereof within a bearing block 39 secured to the base and screw threadably engaging a horizontally extending lug or plate 40 secured to the front face of the central pillar 32 as shown in FIGS. 2 and 3.

Also situated upon the base are a pair of horizontally situated spaced and parallel support members 41 braced to one of the support pillars 30 and including vertically aligned bearing blocks 42 through which a spindle 43 engages. The lower end of the spindle may be situated within a further bearing block 44 secured to base 19, if desired. A crank or handle 45 is secured to the upper end of the spindle 43 and a chain sprocket 46 is secured adjacent the lower end of the spindle just above the bearing block 44.

A further chain sprocket 47 is secured to the screw threaded jack shaft 38 and a sprocket chain 48 extends around sprockets 46 and 47 so that rotation of the handle of crank 45 will rotate the jack screw 38 thus raising or lowering the central pillar 32 relative to the support pillars 30.

A table assembly collectively designated 49 is secured to the upper end of the central pillar 32 and supports the upper and lower shear cutter assemblies collectively designated 50 and 51 respectively. Lower transverse members 52 are secured to the central pillar 32 and upper transverse members 53 are in turn supported upon the lower transverse members 52 and extend upon the opposite side thereof (see FIG. 4).

The table assembly 49 includes an inner lower planar portion 54 situated inboard of the longitudinal axis of the dolly and an upper outboard portion 55 situated outboard of the longitudinal central line and being elevated at the front end thereof to form a pair of entering jaws 56 between which the upper and lower shear cutter assemblies are situated. A downwardly and forwardly inclining guiding ramp 57 extends from the front edge 58 of the lower table portion 54 upon which the outer portion 59 of the sheet being cut, engages and passes over as will hereinafter be described.

The upper shear cutter assembly 50 is situated upon the outer portion 55 of the table and consists of a source of power in the form of an electric motor 60, the shaft 61 of which connects to a gear box 62 also supported upon the upper portion 55. This gear box includes a transverse shaft 63 gear connected to the drive shaft 61 within the gear box and a chain sprocket 64 is secured to the outboard end of shaft 63.

Figure 9:
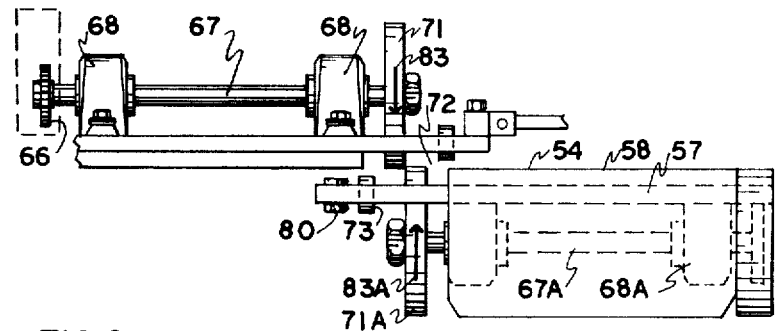
FIG. 9 is a fragmentary front view of the shear cutter assemblies.

A sprocket chain 65 extends around this sprocket 64 and around a drive sprocket 66 secured to a main cross shaft 67 supported for rotation within bearing block 68 secured to the portion 55 of the table (see FIG. 9).

Figure 7:
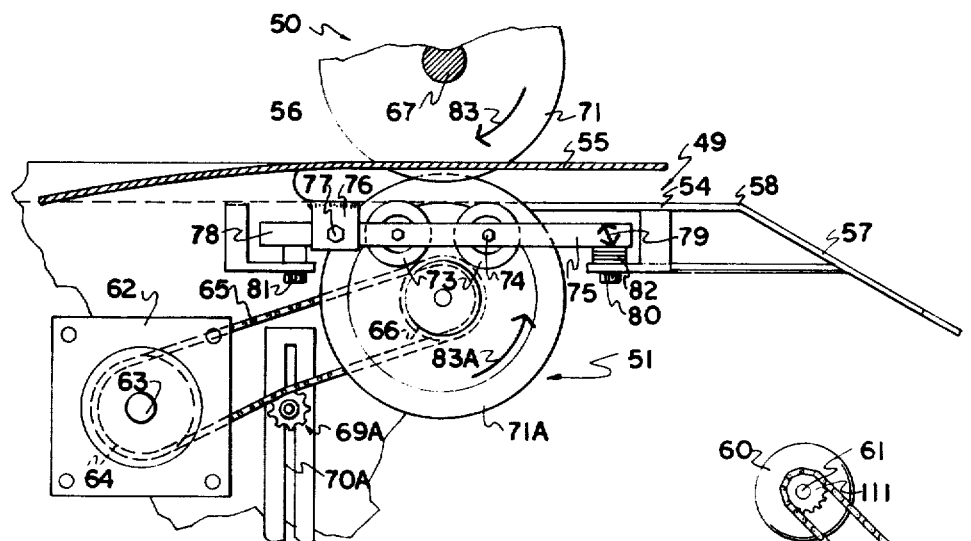
FIG. 7 is an enlarged fragmentary side view of the lower shear cutter assembly.

An adjustable chain tensioning wheel assembly 69 engages the outer run of the chain and adjusts the tension therein in a conventional manner. It is adapted to be moved vertically within vertical guides 70 shown in detail in FIG. 7, but referring, in that drawing, to the lower shear cutter assembly.

Shaft 67 is situated transversely across the front edge of the upper table portion 55 and a shear cutter wheel 71 is secured to the inner end thereof and runs within the gap 72 between the upper and lower table portions and at the entry to the jaws 56 defined thereby.

A pair of support and pressure rollers 73 are journalled for rotation upon spindles 74 which in turn are mounted upon a longitudinally extending bar or block 75 secured to the underside of the table portion 54. A mounting block 76 is secured to the underside of the table portion 54 and a pivot 77 extends through this mounting block and the bar 75 adjacent the rear end 78 of the bar and the bar can be pivoted around the pivot 77 in the direction of double headed arrow 79 with bolts 80 and 81 holding the bar firmly in position once the adjustment has been made. This enables the support rollers 73 to be adjusted relative to the underside of the sheet 11 being cut and it will be noted that these support rollers are situated one upon each side of the axis of rotation of the lower shear cutter wheel 71A. Spacer washers 82 may be inserted on bolt 80 to support the front end of the bar in the desired position.

A similar pair of rollers 73A are mounted in a similar fashion relative to the upper shear cutter wheel 71 and may be adjusted in a similar manner to apply pressure downwardly upon the sheet 11 as it passes through the cutter assembly. The upper rollers engage the main portion of the sheet and the lower rollers support the portion 11A being cut therefrom along the line 12.

Once again as the structure is similar, similar reference characters have been applied, but with the suffix "A" added thereto for clarity. These support rollers prevent the cut portion 11A of the sheet from bending downwardly immediately it leaves the cutting wheels 71 and 71A.

It will also be noted that the upper shear cutter wheel 71 rotates in the direction of arrow 83 and that the lower shear cutter wheel 71A rotates in the direction of arrow 83A thus assisting in the cutting action and urging or facilitating the movement of the trolley in the direction of arrow 15 as will hereinater be described.

The aforementioned trammel assembly 16 includes support blocks 84 mounted upon the inner edge of the upper outer table portion is spaced apart relationship, each support block having a pair of lugs 85 extending forwardly therefrom with a horizontal pivot pin 86 mounting a block 87 for movement around a horizontal axis. Vertical pivots 88 secure the inner ends of inner trammel members 89 for limited movement around a vertical axis and an outer trammel component 90 includes a pair of diverging legs 91 which telescopically engage the outer ends of the trammel members 89 and may be clamped in the desired position by means of clamp bolts 92. The vertical pivots 88 assist in adjusting the spacing of the members 89 as the portion 90 is moved inwardly or outwardly.

A mounting member 93 is secured at the outer ends of the legs 91 and an outboard member 94 telescopically engages this member 93 and is clamped in the desired position by means of clamp bolts 95.

The aforementioned centre point portion 13 is secured vertically within the distal end of the portion 94 by means of a clamp bolt 96 for vertical adjustment and the lower end 97 of this centre point or member 13 engages the aforementioned aperture 17 within the sheet 11.

Means are provided to raise and lower the trammel assembly from a sheet engaged position to a raised position, said means being collectively designated 98. It includes an over centre arrangement as will hereinafter be described, in order to detachably secure it in the uppermost position.

In operation, the sheet 11 to be cut is placed upon the supporting table or surface 10 and the aperture 17 is drilled in the required location and acts as the centre of the arc or circle defined by dotted line 12.

The trammel assembly is adjusted so that the intersection of the teo shear cutting wheels 71 and 71A coincide with the start of the dotted line 12 and the height of the table and the shear cutter assemblies is adjusted by means of the jack assembly 37 as hereinbefore described.

The two electric motors are connected to a source of electrical energy (not illustrated) by a flexible cable (not illustrated) and these two motors drive the shear cutter wheels 71 and 71A as hereinbefore described.

The leading edge of the sheet 11 is entered between the jaws 56 formed by the table portions 54 and 55 and the dolly assembly is pushed in the direction of arrow 15 so that it engages the sheet 11 and shears same along the line 12 with the inner portion of the sheet, supported upon the support surface 10 and upon the lower table 54.

The portion 11A being sheared by the shear cutter wheels 71 and 71A, passes underneath the outer upper table portion 55 as it is severed from the main portion.

The speed of cut is dependent upon the thickness of the material and the power of the motors 60 and 60A and the fact that both shear cutter wheels are driven, facilitates the movement of the dolly assembly together with the equipment support thereby. In fact in most circumstances, once the sheet has entered the cutting wheels, the rotation of these wheels provides the necessary power to move the dolly assembly.

Figure 12:
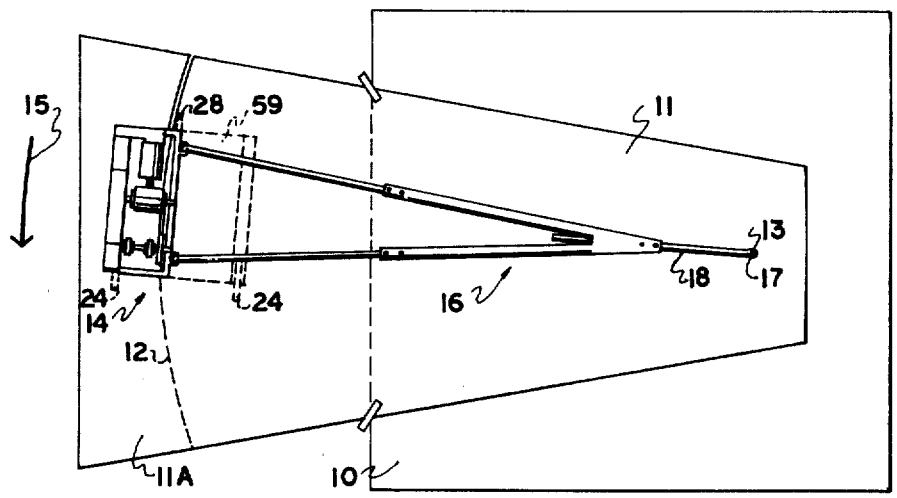
FIG. 12 is a partially schematic top plan view, reduced in scale from the remaining drawings showing the device in use.

Although a segment of a circle is shown in FIG. 12, nevertheless it will be appreciated that full circles can be cut if desired thus facilitating the cutting of arcs or circles from sheet metal of relatively large radii particularly suitable for use in the manufacture of grain bins and the like.

Dealing next with the aforementioned over centre arrangement 98, for the trammel assembly, an over centre link plate 99 is provided with a hook 100 pivotally secured to one end thereof and in turn, via a link 101, to an adjustable nut and bolt assembly 102 which extends through the bracket 103 extending upwardly from supporting structure adjacent to the inner end of the trammel assembly.

A further hook 104 is pivotally secured centrally of the link plate 99 and engages one end of a flexible link such as chain 105. The other end of chain 105 in turn engages a bracket 106 extending upwardly from adjacent the inner end of the trammel 16 (see FIG. 4). An actuating lever 107 is fixedly secured to the link plate 99 which is movable with the actuating lever.

Figure 11:
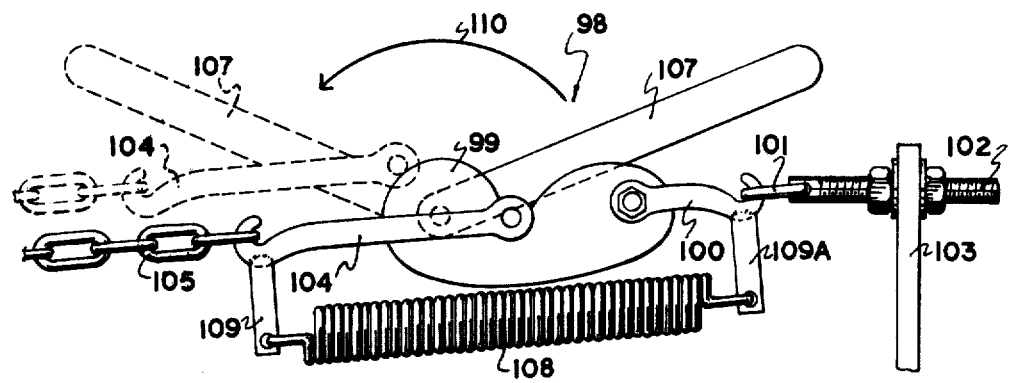
FIG. 11 is a detail of the over centre lifting and lowering mechanism for the trammel boom.

A spring 108 extends between the bracket 103 and an offstanding bracket 109 on the inner end of the chain 105. When in the full line position illustrated in FIG. 11, the spring is extended thus assisting in the lifting action of the trammel assembly.

However, when it is desired to lower the trammel assembly, the actuating lever 107 together with link plate 99 is moved in the direction of arrow 110 to the position shown in phantom. This allows the trammel to lower to the working position. Alternatively the spring assembly 108A may be used as illustrated in FIGS. 2 and 4, in order to assist in the raising of the trammel assembly.

Figure 10:
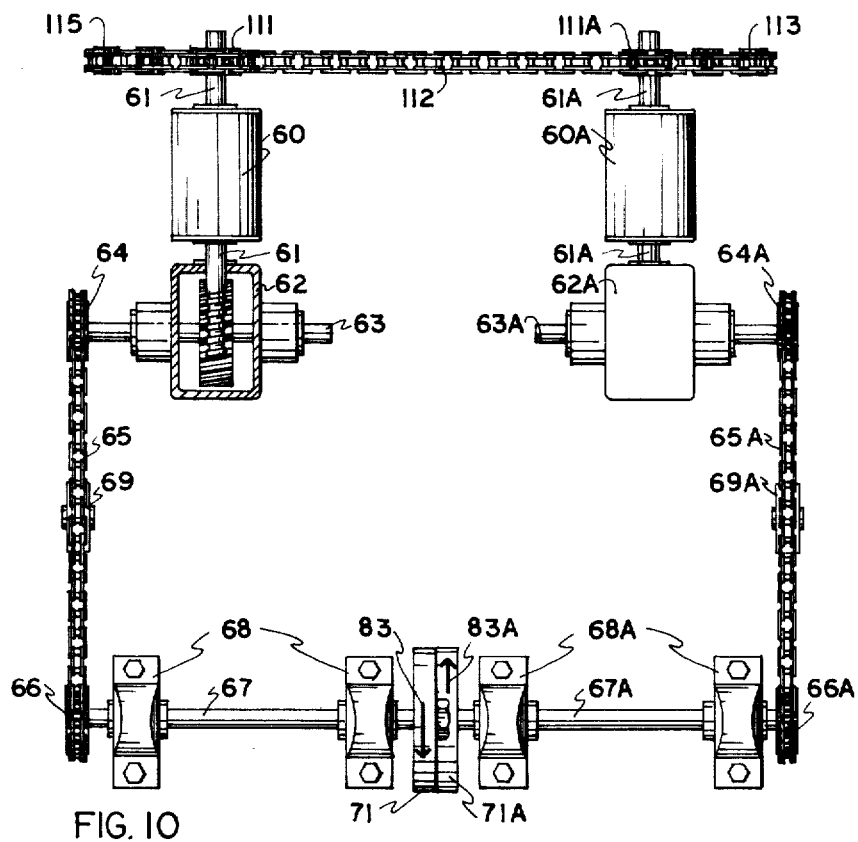
FIG. 10 is a partially schematic plan view showing the drive to the shear cutter assemblies.
Figure 13:
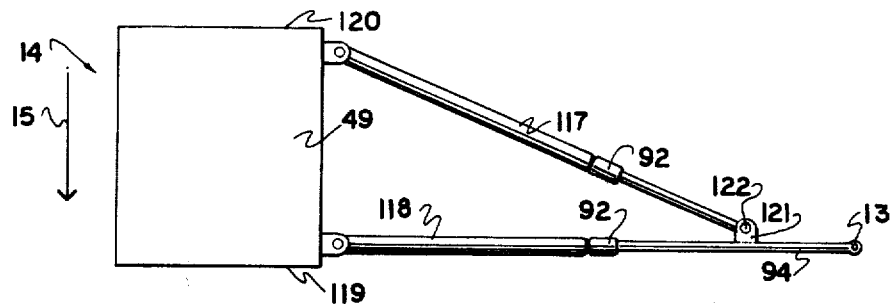
FIG. 13 is a view similar to FIG. 5 showing an alternate construction.

Finally, reference should be made to FIGS. 4, 10 and 13. The upper and lower drive motors 60 and 60A respectively should drive the shear cutter wheels 83 and 83A at exactly the same speed for optimum cutting action so that means are provided to synchronize the speed of these two motors.

The shafts 61 and 61A extend rearwardly of the two motors and are provided with similar chain sprockets 111 and 111A and an endless chain 112 extends around these sprockets and around idlers and tighteners situated within the gear casing 113 illustrated in FIG. 4.

The run of the chain 112 extends firstly from sprocket 111A, around a lower idler sprocket 113 and an upper idler sprocket 114 and thence around sprocket 111, returning via idler and adjusting chain sprockets 115 and 116 as clearly shown in FIG. 13.

This provides th necessary synchronization to the two motors.

FIG. 13 shows a partially schematic top plan view of an alternate construction to FIG. 5 with reference character 14 illustrating the device schematically and with reference character 49 illustrating the table generally.

The trammel assembly 16A of this particular embodiment includes trammel members 117 and 118 being telescopically adjustable as hereinbefore described by means of clamp bolts 92 and being mounted by the inner ends thereof, by the hinging mechanisms 84–88 as hereinbefore described.

However, in this particular alternative embodiment, the front member 118 is hinged by the inner end thereof to adjacent the front 119 of the table assembly 49 and extends outwardly substantially at right angles to the longitudinal axis thereof with the sheet engaging pivot or pin 13 being provided on the distal end of this front trammel member.

The rear trammel member 117 acts as a brace and is hinged by the inner end thereof adjacent the rear end 120 of the table and extends diagonally to be pivotally secured to a lug 121 extending from the front trammel member intermediate the ends thereof, pivot pin 122 constituting this connection.

The substantially right angular location of the front trammel member 118 assists in the self-driving action of the shear cutting wheels upon the dolly assembly and facilitates the turning thereof as it travels in the arc.

Figure 14:
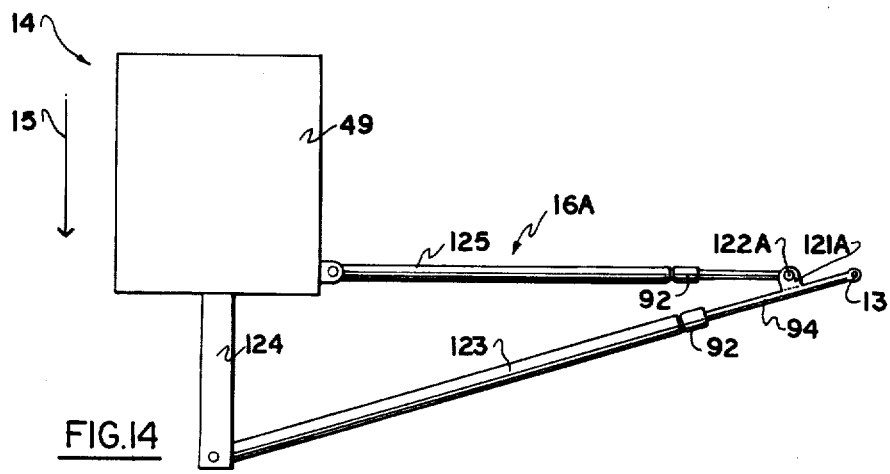
FIG. 14 is a view similar to FIG. 5 showing the preferred embodiment of the trammel assembly.

However, the preferred embodiment is shown in FIG. 14 in which the front trammel member 123 is pivotally secured by the inner end thereof to a forwardly extending frame member 124 secured to and extending forwardly of the table assembly 49 and extending diagonally rearwardly to the sheet engaging pin assembly 13.

In this embodiment, the brace member 125 is pivotally secured by the inner ends thereof to adjacent the front of the table assembly 49 and extends outwardly substantially at right angles thereto to be connected by means of pin 122A to lug 121A extending from the front member 123. In both cases, the trammel assemblies are adjustable by the telescopic construction thereof and the clamp bolts 92.

Figure 15:
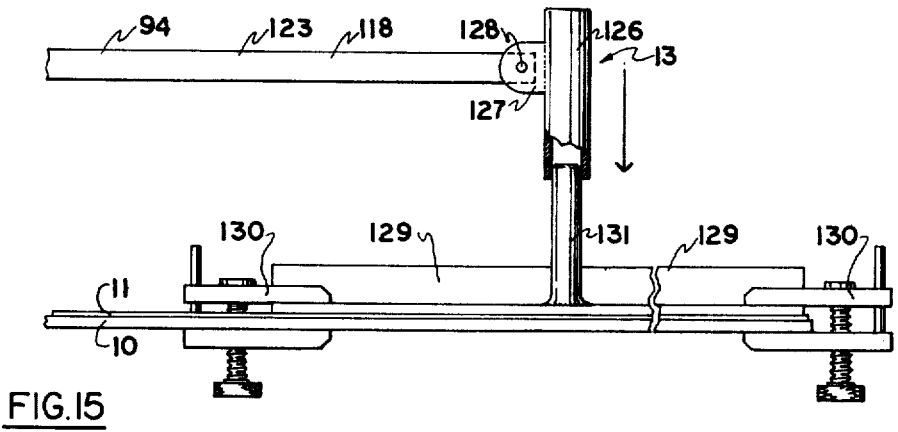
FIG. 15 is a fragmentary side elevation of the preferred embodiment of the sheet engaging end of the trammel assembly.

FIG. 15 shows the preferred embodiment of the pin construction 13, specifically designated 13A in this view, in which a short length of tubing 126 is pivotally secured to the end of the trammel member 94, 118 or 123 by means of lug 127 and pivot pin 128. A length of angle iron 129 is detachably clamped to the sheet 11 adjacent the centre of radius of the cut thereof, by means of clamps 130 and is provided with a pin or bolt 131 extending upwardly therefrom over which the sleeve 126 may engage once the pin 131 has been positioned in the desired location.

Although electric motors 60 and 60A are shown as sources of power for the shear cutters 71 and 71A respectively, nevertheless it will be appreciated that other sources of power such as synchronized hydraulic motors (not illustrated) can be used.

Figure 8:
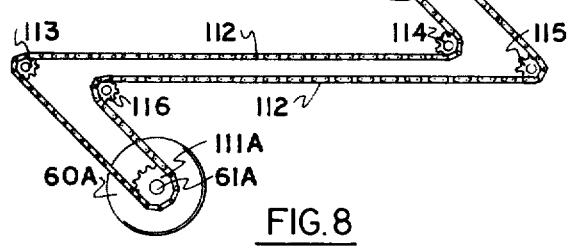
FIG. 8 is a rear view of the interconnecting chain and sprocket assemblies between the upper and lower electric motors.

Also, although FIG. 8 shows one method of synchronization of the speeds of rotation of the cutter wheels 71 and 71A, other means can be provided such as a differential gear box between the gear boxes 62 and 62A. Once again as such structure is conventional, it is not illustrated.

Although the description and drawings refer to the device used as an arc or circle cutter, it can also be used for straight cuts or freehand cuts without the use of the trammel assembly.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. An arc or circle cutter for sheet metal and including a supporting surface for supporting at least part of the sheet being cut; comprising in combination a ground engaging wheeled dolly situated in a plane spaced below and outboard of said supporting surface, supporting structure supported on said dolly including a base, an adjustable trammel assembly extending from said supporting structure and engageable with the sheet at the centre of the arc or radius being cut, upper and lower shear cutter assemblies mounted upon said supporting structure for cutting action upon said sheet being cut, means to drive said cutter assemblies, and means to adjust the height of said upper and lower shear cutter assemblies relative to said dolly, said last mentioned means including a pair of supporting pillars secured to and extending upwardly from said base, a central pillar mounted for vertical movement between said support pillars, guide rollers cooperating between said support pillars and said central pillar and jack means on said base operatively connected to said central pillar to raise and lower said central pillar relative to said support pillars, a table mounted on said central pillar, said table and said upper and lower shear cutter assemblies being supported upon said central pillar and being raised and lowered therewith.

2. The invention according to claim 1 in which each of said shear cutter assemblies includes a shaft journalled for rotation in said supporting structure one above and one below said table, and a shear cutter wheel mounted upon each of said shafts, said shear cutter wheels overlapping one another adjacent the meeting peripheries thereof and being situated in side by side relationship to form a cutting jaw assembly, said means to drive said wheel cutters moving the overlapping portions thereof in the same direction.

3. The invention according to claim 1 in which said table includes a lower inner portion and an upper outer portion, said upper shear cutter assembly being mounted upon said upper outer portion, said lower shear cutter assembly being mounted below said lower inner portion, said lower inner portion supporting the curved part of the sheet being cut, the portion of said sheet being separated from said curved part of said sheet, passing under said upper outer portion.

4. The invention according to claim 2 in which said table includes a lower inner portion and an upper outer portion, said upper shear cutter assembly being mounted upon said upper outer portion, said lower shear cutter assembly being mounted below said lower inner portion, said lower inner portion supporting the curved part of the sheet being cut, the portion of said sheet being separated from said curved part of said sheet, passing under said upper outer portion.

5. The invention according to claim 1 in which said lower shear cutter assembly includes a support roller assembly adjacent thereto, said support roller assembly supporting the underside of the portion of said sheet being severed by said shear cutter assemblies, said upper shear cutter assembly including a pressure roller assembly, said pressure roller assembly bearing upon the upper surface of the portion of the sheet inboard of said dolly, each said support roller assembly and said pressure roller assembly including a mounting bar, a pair of rollers journalled for rotation thereon, and means to adjust the relationship of said roller assemblies relative to one another.

6. The invention according to claim 2 in which said lower shear cutter assembly includes a support roller assembly adjacent said shear cutter wheel, said support roller assembly supporting the underside of the portion of the sheet being severed by the shear cutter wheel, said upper shear cutter assembly including a pressure roller assembly adjacent said shear cutter wheel, said pressure roller assembly bearing upon the upper surface of the portion of the sheet inboard of said dolly, each said support roller assembly and said pressure roller assembly including a mounting bar, a pair of rollers journalled for rotation thereon one upon each side of the axis of said shear cutter wheel, and means to adjust the relationship of said roller assembly relative to one another.

7. The invention according to claim 3 in which said lower shear cutter assembly includes a support roller assembly adjacent thereto, said support roller assembly supporting the underside of the portion of said sheet being severed by said shear cutter assemblies, said upper shear cutter assembly including a pressure roller assembly, said pressure roller assembly bearing upon the upper surface of the portion of the sheet inboard of said dolly, each said support roller assembly and said pressure roller assembly including a mounting bar, a pair of rollers journalled for rotation thereon, and means to adjust the relationship of said roller assemblies relative to one another.

8. The invention according to claim 4 in which said lower shear cutter assembly includes a support roller assembly adjacent said shear cutter wheel, said support roller assembly supporting the underside of the portion of the sheet being severed by the shear cutter wheel, said upper shear cutter assembly including a pressure roller assembly adjacent said shear cutter wheel, said pressure roller assembly bearing upon the upper surface of the portion of the sheet inboard of said dolly, each said support roller assembly and said pressure roller assembly including a mounting bar, a pair of rollers journalled for rotation thereon one upon each side of the axis of said shear cutter wheel, and means to adjust the relationship of said roller assembly relative to one another.

9. The invention according to claims 1, 2 or 3 in which said trammel assembly includes an adjustable boom component pivotally supported by the inner end thereof upon said supporting structure and movable in a vertical plane from a sheet engaging position to a raised position and vice versa, means to raise and lower said boom component, over centre means cooperating with said last mentioned means to detachably lock said boom component in the raised position and a centre pivot component on the distal end of said boom component engageable with said sheet at the centre of the arc or circle being cut.

10. The invention according to claims 4, 5 or 6 in which said trammel assembly includes an adjustable boom component pivotally supported by the inner end thereof upon said supporting structure and movable in a vertical plane from a sheet engaging position to a raised position and vice versa, means to raise and lower said boom component, over centre means cooperating with said last mentioned means to detachably lock said boom component in the raised position and a centre pivot component on the distal end of said boom component engageable with said sheet at the centre of the arc or circle being cut.

11. The invention according to claims 7 or 8 in which said trammel assembly includes an adjustable boom component pivotally supported by the inner end thereof upon said supporting structure and movable in a vertical plane from a sheet engaging position to a raised position and vice versa, means to raise and lower said boom component, over centre means cooperating with said last mentioned means to detachably lock said boom component in the raised position and a centre pivot component on the distal end of said boom component engageable with said sheet at the centre of the arc or circle being cut.

* * * * *